Figure 4:
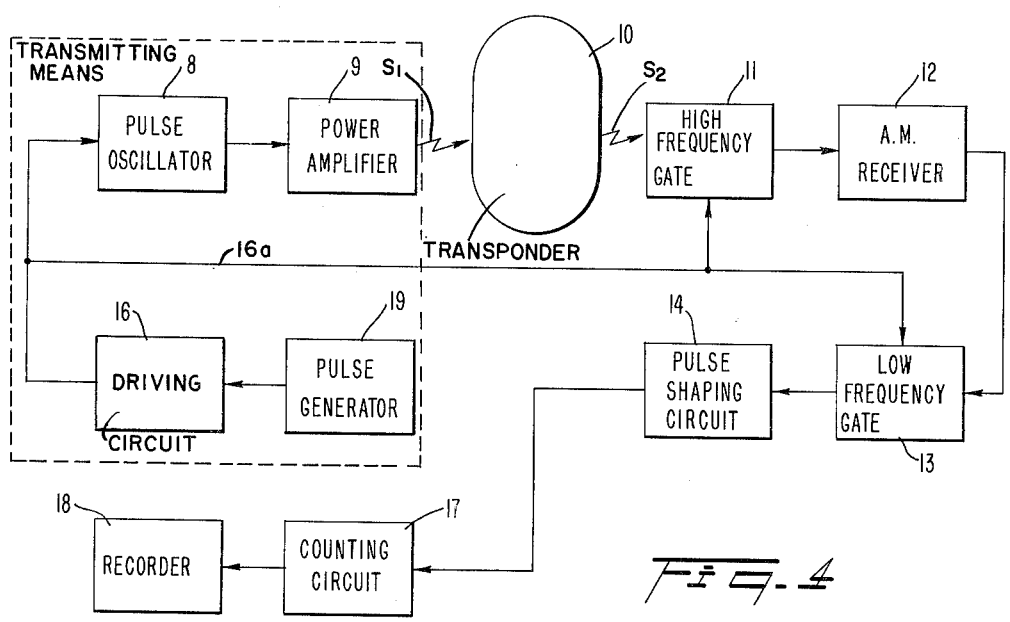

Jan. 18, 1966  JINICHI NAGUMO ETAL  3,229,684
TELEMETERING SYSTEM FOR PHYSIOLOGICAL MEASUREMENTS
Filed Dec. 20, 1960  2 Sheets-Sheet 1
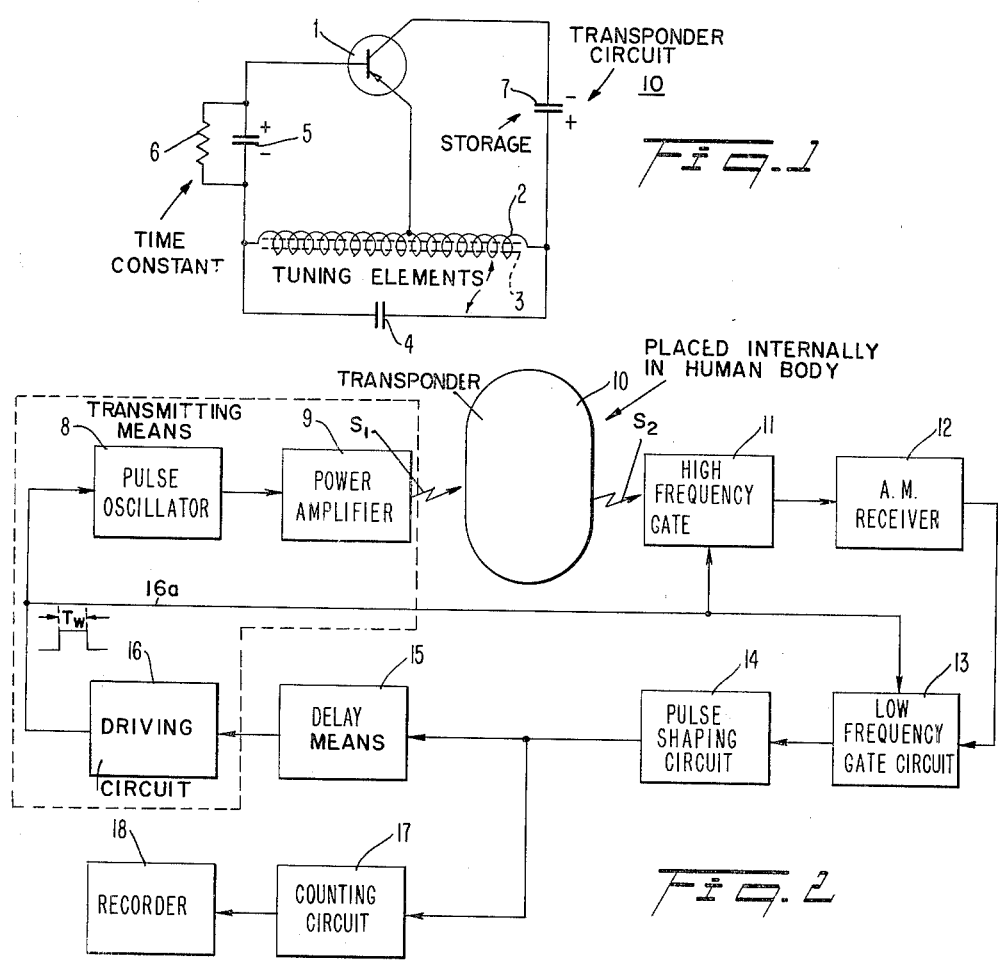
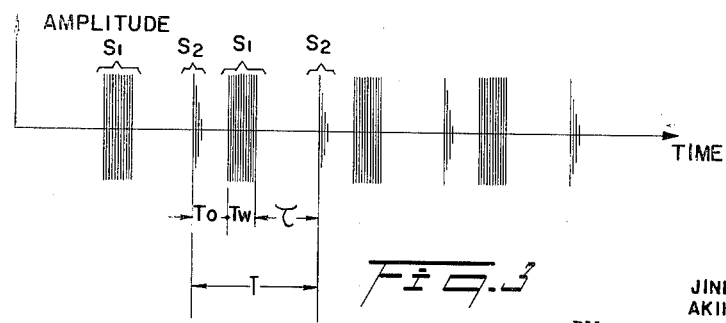
INVENTORS
JINICHI NAGUMO
AKIHIKO UCHIYAMA
BY Roy C. Hopgood
ATTORNEY Jan. 18, 1966  JINICHI NAGUMO ETAL  3,229,684
TELEMETERING SYSTEM FOR PHYSIOLOGICAL MEASUREMENTS
Filed Dec. 20, 1960  2 Sheets-Sheet 2

INVENTORS
JINICHI NAGUMO
AKIHIKO UCHIYAMA
BY
ATTORNEY

United States Patent Office 3,229,684
Patented Jan. 18, 1966

3,229,684
TELEMETERING SYSTEM FOR PHYSIOLOGICAL MEASUREMENTS
Jinichi Nagumo, 68 Shirogane, Sarumachi, Minatoku, Tokyo, Japan, and Akihiko Uchiyama, Tokyo, Japan; said Uchiyama assignor to said Nagumo
Filed Dec. 20, 1960, Ser. No. 77,079
Claims priority, application Japan, Dec. 24, 1959, 34/40,546
10 Claims. (Cl. 128—2)

This invention relates to a telemetering system for detecting and transmitting physiological information from within the human body and more particularly, to such a system which does not require a source of power as an integral part of the information detector or transmitter.

In the past, many regions of the human body have been inaccessible for study under simple testing procedures. For example, in investigating areas of the gastro-intestinal tract, either surgical procedures had to be utilized or resort made to the use of instruments, such as the gastroscope, gastrotube, or an orally swallowable tube having suitable instruments at its end. Besides being limited in the areas of the human body which could be investigated, these procedures proved to be abnormal, uncomfortable and at times painful to the patient.

In order to avoid these problems, recent advances in the field of medical instrumentation have produced telemetering arangements utilizing miniaturized components which can be swallowed orally as a unit by the patient. The telemetering arrangement may then be used to detect and transmit information relative to some physiological variable such as, the temperature, pressure or pH of a portion of the gastro-intestinal tract. The state of the art of these instruments has recently been described in "The Transactions of the IRE on Medical Electronics" (Radio Telemetering from Within the Human Body, R. F. Mackay, June 1959, pages 100–105). Generally, the conventional telemetering instruments as described in this publication comprise a transducer, a modulator, and transmitter and a power supply, and, although they have operated satisfactorily, they are inherently limited in utility.

The inherent limitations arise due to the need for a power supply for the telemetering unit. Either the unit must be orally swallowed with a connection through the digestive tract to an external power supply, or the power supply must be an integral part of the telemetering unit. In the former case, discomfort and often pain are suffered by the patient, whereas, under the latter conditions the telemetering instrument has an increased size and weight. Moreover, since the unit must be orally swallowed, the power supply has to be extremely small and, consequently, a battery having a large capacity cannot be utilized. This prevents measurements from being made for extending periods of time in a particular part of the body.

Accordingly, it is an object of the invention to provide a telemetering system for measuring specific physiological variables of the human body which includes an orally swallowable information detecting and transmitting unit that does not require electrical connections from within the patient's body to an external power supply.

It is another object of the invention to provide such a system which does not utilize a power supply as an integral part of the orally swallowable transponder or information detecting and transmitting unit.

It is a further object of the invention to provide a telemetering system for measuring physiological variables of the human body which includes a transponder employing an equivalent number of components as a conventional unit but which is smaller in size and weight.

It is still a further object of the invention to provide such a telemetering system which can measure specific physiological variables of the human body for extended periods of time.

Another object of the invention is to provide a telemetering system having an information detecting and transmitting unit which also acts as a receiver and storer of power.

In accordance with an aspect of the invention there is provided a telemetering system for measuring specific physiological variables in a living body which comprises a transponder or information detecting and transmitting means that are placed in the living body and an arrangement external of the body for receiving the transmitted information relative to a particular variable. An arrangement is also provided external of the living body for transmitting high frequency power to the transponder for operation.

Figure 5:
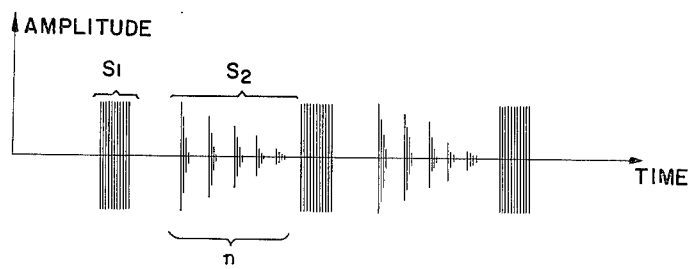

The above mentioned and other features and objects of this invention and the manner of attaining them will become more apparent and the invention itself will be best understood by reference to the following description of the embodiment of the invention taken in conjunction with the accompanying drawing, wherein:

FIG. 1 is the transponder circuit diagram;
FIG. 2 is a block diagram illustrative of one embodiment of the telemetering system of the invention;
FIG. 3 shows the wave forms of the received power and transmitted information of the information unit utilized in the embodiment of FIG. 2;
FIG. 4 is a block diagram of a second embodiment of the telemetering system of the invention; and
FIG. 5 shows the wave form of the received power and transmitted information of the transponder utilized in the system of FIG. 4.

Referring now to FIG. 1, the transponder circuit of the novel telemetering system is shown as utilizing purely electrical components. However, it should be understood that specific transducing means will be described hereinafter for substitution in this circuit dependent upon the variable that is to be measured. The unit which may be orally swallowed by a patient for measuring specific physiological variables in the patient's body, includes a PNP type transistor 1, a coil 2 tuned by a magnetic core 3, tuning capacitor 4, a time constant circuit including the blocking capacitor 5 and the leak resistance 6, and a storing capacitor 7. If the capacitor 7 is replaced by a battery, it should be obvious that the circuit is the well-known Hartley oscillator circuit. Similarly, if the transistor is an NPN type, then the Colpitts oscillator circuit may be utilized to perform the same function to be hereinafter described.

If it is assumed that the information unit which is set inside a patient's body, is excited by a power transmitter placed outside of a living body and the frequency of this transmitter is adjusted to the resonant frequency of the tuning circuit comprising the coil 2 and the capacitor 4, then high frequency electromotive force may be induced across this tuning circuit. The induced high frequency power is applied to the base and collector leads of the transistor 1 and is rectified and stored in the capacitor 7. Since the transistor which is utilized is a PNP-type, the polarity of the capacitor 7 is as indicated in the drawing. During the period of time that the resonant circuit is excited by the external power source, the blocking capacitor 5 is also charged by the current which flows through the collector to the base and the emitter to the base, respectively, of the transistor 1.

If the power transmitter discontinues the transmission of power so that exciting power is no longer supplied to the transponder, the transponder circuit will begin to oscillate at the same frequency as the frequency of the power transmitter. The frequency of oscillation is determined by the tuning circuit and the oscillation continues until the power stored in the capacitor 7 is consumed. It is obvious, therefore, that the unit does not contain a particular power source in itself, but rather it acts as a receiver when it is excited by an external high frequency power source so that capacitor 7 is charged and, thereafter, it operates as an oscillator utilizing this stored charge as a power source.

Oscillation in the transponder depends, in part, on the time constant of the base circuit of the transistor 1. This is determined by the blocking capacitor 5, the leak resistance 6 and the backward resistance of the base-to-collector junction of the transistor 1. When the time constant of the base circuit is selected to have a large value, as compared to the period of the oscillating frequency, oscillation does not start immediately after the induced electromotive force is diminished, but it does begin after the capacitor 5 discharges the current through the leak resistance 6 and the base lead of the transistor 1. When this occurs, the transistor is no longer biased in a cut-off condition. During this interim period, the storage capacitor 7 loses a part of its charged power. However, a negligible amount is lost since the capacitor which is utilized has a large charging capacity.

When oscillation begins, the capacitor 5 is gradually charged by the high frequency current which flows across the base electrode of the transistor 1 until the transistor is again biased to a cut-off condition thereby terminating the oscillation. The circuit repeats this same oscillating condition intermittently and the capacitor 7 loses its charge during each period of the intermittent oscillation, so that the amplitude of the oscillation decreases and the repetition rate of the intermittent oscillations increases. If it is desired that the base circuit of the transistor have a large time constant, the leak resistance may be omitted. This omission is desirable since it reduces the necessary number of circuit components. On the other hand, if the time constant of this base circuit is selected to be small, the transistor 1 is never biased to a cut-off condition and consequently, as soon as the power transmitter discontinues transmission (when there is no input to power amplifier 9), the oscillator begins to oscillate and its amplitude is attenuated in an exponetial manner so that the oscillation is no longer intermittent.

In the above description, the tuning circuit comprising the coil 2 and the capacitor 4 and the transistor 1 are commonly utilized both for receiving power and for oscillation. It is also possible to supply the power in another way. For example, a separate tuning circuit which is resonant at the frequency of the power transmitter and a rectifier, such as a diode, can be provided in the transponder. If the induced electromotive force across the tuning circuit is rectified and connected to the terminals where a battery would be connected, that is the terminals corresponding to the two terminals of the storing capacitor 7, then the power receiving circuit would be completed. Under these conditions, a resonant circuit for receiving power would be provided separately and there would be no requirement for restricting the period when power is supplied by the power transmitter and the period of transmission by the transponder, so that it would be possible to transmit the power in continuous manner.

As previously stated, the information unit, which has been described as utilizing purely electrical components, may have appropriate substitution of components made for measuring specific physiological variables of a human body. Thus, if any circuit component of the transponder changes in value, depending on a specific variable being measured, it is possible to measure these variables and provide information. For example, variations of the time constant of the base circuit of the transistor 1 or the variation of the resonant frequency of the tuning circuit comprising the coil 2 and the capacitor 4 are available for this purpose. Therefore, variables such as temperature, pressure and pH may be measured by this unit.

The transponder may transmit information as to the temperature of a portion of the patient's body when the leak resistance 6 of FIG. 1 is replaced by a thermistor. The thermistor is connected in parallel or series with the blocking capacitor 5 which is replaced by a temperature sensitive capacitor or when the time constant variation of this base circuit is arranged so as to affect the oscillating frequency of the transmitter. If the tuning capacitor 4 is replaced by a temperature sensitive capacitor or if the core 3 is replaced by a ferrite core which varies its permeability in accordance with temperature, information relative to the temperature condition can be transmitted as a frequency shift.

If the core 3 is provided with a diaphragm which is arranged to move its position dependent on the pressure of the area under observation, the pressure variable can be measured as a frequency shift of the oscillation frequency and transmitted to an external receiver.

The measurement of pH may be achieved by the use of a particular plastic which varies its dimensions dependent on the value of the pH of the fluid in which the plastic is immersed. The plastic body may be connected to the core 3, displacing the position of the core according to the expansion or contraction of the plastic body and again the pH may be measured as a frequency shift of the oscillation frequency of the transmitter. This type of arrangement is similar to that utilized for the measurement of pressure.

Referring now to FIG. 2 for a detailed explanation of the telemetering system of the invention, a pulse oscillator 8 is shown which oscillates during a period where a trigger pulse is applied. This oscillator, along with a high frequency power amplifier 9, constitutes a power transmitter. The transponder is indicated at 10 and high frequency and low frequency gates are indicated at 11 and 13 respectively. An amplitude modulation receiver 12 is coupled to the gates 11 and 13 and a pulse shaping circuit is coupled to the gate 13. The output of the pulse shaping circuit 14 feeds two channels. The first of these channels comprises a delay means such as a delay line 15 and a driving circuit 16 for the pulse oscillator 8. The second channel includes a pulse counter circuit 17 and a recorder 18. In place of the pulse oscillator 8, a high frequency oscillator and a gate circuit or a high frequency oscillator and an amplitude modulator may be utilized.

In the initial operation of the system, the driving circuit 16, which comprises a monostable multivibrator, is manually driven and a signal pulse is supplied to the pulse oscillator 8. The oscillator 8 oscillates, supplying power to the transponder 10, for a time period dependent upon the period of the driving pulse. The duration of oscillation is equivalent, therefore, to the width of the pulse supplied by the driving circuit 16.

The transmitted power signal S, is received at the transponder 10 as hereinabove described. Oscillations in transponder 10 begin shortly after the end of this power supplying period; the time delay being dependent upon the time constant of the base circuit of the transistor 1. After the transmitted signal $S_2$ from the unit 10 is amplified and demodulated in the receiver 12 which comprises one stage of a high frequency amplifier circuit and two stages of intermediate frequency amplifier circuits, the signal is shaped into a rectangular waveform by the pulse shaping circuit 14. This rectangular waveform is received at the pulse counter circuit 17 which counts the number of pulses which are thereafter recorded in the recorder 18. The signal provided by the pulse shaping circuit 14 is also applied to delay means 15 comprising a monostable multivibrator to give the necessary delay time to the output pulse of the circuit 14. This delayed pulse again triggers the driving circuit 16 to provide a pulse for operation of the power transmitter to supply high frequency power to the transponder 10 so that the cycle may be repeated.

The typical variations of the transponder circuit signals are shown in FIG. 3 wherein the abscissa indicates the time parameter. If the time constant of the base circuit of the transistor 1 is small in accordance with the variation of the variable to be measured (e.g., temperature rise), then $\tau$ in FIG. 3 is short. Tau ($\tau$) represents the duration between the end of the high frequency power receiving period and the beginning of the start of oscillation by the transponder 10.

During the reception period, high frequency and low frequency gates 11 and 13, respectively, are provided to eliminate the direct incoming waves which arrive from the power amplifier 9 so that the signal which is transmitted by the transponder is detected. After the time interval in which an output pulse from the driving circuit is present, gates 11 and 13 will allow an output from transmitter 10 to flow directly through to the pulse shaping circuit. The branched conductor 16a thus conducts a pulse which is essentially a disabling pulse.

Referring again to FIG. 3, a relationship exists between the time of one cycle T and $\tau$ which may be expressed as follows: $T=\tau+T_D+T_W$, where $T_D$=the time between the beginning of the transmission portion of the cycle and the beginning of the period of power reception, and $T_W$=the period during which power is transmitted to the unit 10. Therefore, the frequency F may be derived so that $F=1/T$. However, $\tau$ is dependent on the source voltage of the transponder 10 and increases with an increase in the source voltage. Thus, when the measurements are made based on $\tau$, that is, the variation in the time constant of the transistor base circuit, it is necessary to transmit enough high frequency power from the external power source so that $\tau$ will not vary as a result of inadequate power. Moreover, it is also necessary to stabilize the source voltage and this may be accomplished by adding a Zener diode in parallel with the storing capacitor 7.

A second embodiment of the telemetering system of the invention is shown in FIG. 4. In this embodiment, a pulse generator 19 provides driving pulses to the driving circuit 16 for the pulse oscillator 8. The driving pulses are provided at a constant repetition rate so that the high frequency power is applied to the information unit 10 at a constant repetition rate.

In the operation of this system, the counting circuit 17 counts the number of oscillations $n$, as shown in FIG. 5, which are intermittently transmitted from the information unit 10 for each cycle of operation. Since $n$ increases as the time constant of the base circuit of the transistor 1 becomes smaller, the temperature in the patient's body can be measured as a function of the number of $n$. Similarly, $n$ increases as a function of a decrease in the source voltage and therefore, it is also necessary to provide an arrangement, such as the use of Zener diode, to keep the source voltage constant.

In the embodiment of FIGS. 2 and 4, the low frequency gate 13 is utilized in addition to the high frequency gate 11 to assure the complete elimination of the directly transmitted waves from the power transmitter to the transponder 10.

If there is a frequency shift of the information transmission from the transponder 10, so that the information is not transmitted in the form of variations in $\tau$ or by the number of intermittent oscillations $n$, the receiver 12 must be a frequency modulation receiver and the high frequency gating circuit 11 must have a wide frequency bandwidth. The tuning frequency of the information transmitter varies according to the values which are being measured and, therefore, in order to supply the necessary amount of high frequency power it is necessary that the frequency of the power transmitter follow the changing tuning frequency of the transponder. If the output from the intermediate frequency amplifier stages of the receiver is branched and an amplitude modulation detector is connected to this branch then two variables can be measured at the same time, that is, those variables based on a change in the time constant of the base circuit of the transistor 1 and a frequency shift in the frequency of oscillation as caused by the tuning circuit.

In the operation of this telemetering system, a loop or cylindrical antenna may be utilized for transmitting and receiving. The antenna is positioned to surround the body in which the variables are being measured and a common antenna or separate antennas may be employed for the transmitter and the receiver.

It is obvious that the arrangement of this invention makes it possible to make measurements over an extended period of time and the power transmitter supplies the power as it is required by time and frequency. Moreover, it is readily apparent that this invention reduces the volume and weight of the information unit as compared with the conventional unit.

While the foregoing description sets forth the principle of the invention in connection with specific apparatus, it is to be understood that this description is made only by way of example and not as a limitation of the scope of the invention as set forth in the objects thereof and in the accompanying claims. For example, although the transponder has been described as utilizing a transistor circuit, it should be readily apparent that other elements may also be utilized, such as a tunnel diode having negative resistance characteristics and a PN PN diode. In these circumstances, some of the circuits may need an additional tuning circuit for receiving the high frequency power.

What is claimed is:

1. An endoradiosonde system comprising
   transmitting means including a first oscillator and further
   including drive means to control the actuation and deactuation of said oscillator to produce a series of pulses, each pulse comprising a plurality of cycles of oscillations of a selected frequency,
   a tiny passive transponder means adapted to be disposed internally of a living body to produce a first electrical signal varying in accordance with a preselected physiological variable of said body, said transponder means having no internal source of power and having a second oscillation producing circuit means having a feed back loop and including a resonant circuit tuned substantially to said selected frequency of the pulses transmitted by said first transmitting means,
   said second oscillation producing means including time-constant means including a blocking capacitor to control the operating bias of said second oscillator,
   a storage capacitor means coupled to said resonant circuit to store some of the energy received from said transmitting means by said transponder means,
   said resonant circuit, time-constant bias means and storage means coupled to the feedback loop of said second oscillation producing means,
   said storage means discharging after receipt of said transmitted pulses through said time-constant means to provide power for said second oscillation means to produce oscillations after said blocking capacitor has discharged an amount to bias said second oscillating means to an oscillation operating state, the oscillations from said second oscillation producing means being produced and transmitted at a time interval after receipt of said transmitted pulses,
   said time-constant means and said resonant circuit having at least one variable parameter responsive to a physiological state, and
   external detecting means responsive to the signals from said second oscillating means to determine the variations of said physiological variable.

2. The system of claim 1, wherein said second oscillator includes means coupled to the tuned circuit for rectifying said signals developed from said resonant circuit.

3. The system of claim 1, wherein said external detecting means includes means for selecting the communicated information, means coupled to the selecting means for shaping said information into measurable data, and means responsive to said data for recording said information.

4. The system of claim 1, wherein said receiving means also comprises means coupled to the shaping means for providing a delayed activation of said control means, whereby a predetermined cyclical relationship may be maintained.

5. The endoradiosonde system of claim 1 in which said external detecting means is responsive to the time interval between the transmission of pulses from said first oscillator and the initiation of oscillations from said second oscillator to determine the physiological condition.

6. The endoradiosonde system of claim 1 in which said external detecting means is responsive to the number ($n$) of oscillations produced by said second oscillator before said transmitting means transmits the next series of cycles.

7. The endoradiosonde system of claim 1 in which said external detecting means is responsive to the frequency of the oscillations produced by said second oscillator as a determinant of the physiological condition.

8. The system of claim 1 in which said detecting means includes discrimination means and counting means.

9. A method for ascertaining information relative to physiological variables of a living body comprising the steps of positioning within said body a tiny transmitting and receiving station capable of transmitting an information carrying electrical signal which varies in accordance with preselected variables of the body and capable of receiving electrical signals produced external of said body to activate said station by providing the power to transmit said information signal, transmitting an activating electrical signal external of the body to be received by said station, and receiving said transmitted activating signal and storing part of the energy contained therein and using said stored energy a predetermined time after receipt of said activating signal to energize said station to transmit said information signal, said station being devoid of an internal activating power source.

10. An information ascertaining unit for use in telemetering physiological variables comprising means responsive to a predetermined power frequency signal from an external power transmitter to produce a signal, means coupled to the responsive means for rectifying said signal, means coupled to the rectifying means for storing the rectified signal during a first portion of a cycle, said responsive means communicating data relative to a physiological variable in response to the stored signal during a second part of said cycle, and time constant means coupled to the rectifying means in response to a second physiological variable causing said rectifying means to communicate the data relative to said second variable.

References Cited by the Examiner

UNITED STATES PATENTS

| | | | |
|---|---|---|---|
| 2,910,579 | 10/1959 | Jones et al. | 325—29 |
| 2,918,573 | 12/1959 | Hollmann | 325—409 |
| 2,958,781 | 11/1960 | Marchal et al. | 325—496 |
| 2,997,535 | 8/1961 | Brady et al. | 325—391 |
| 3,051,896 | 8/1962 | Bieganski | 128—2 X |

OTHER REFERENCES

Mackay: IRE Transactions on Med. Elec., June 1959, pp. 100–105.

VonArdenne: Naturwissenschaften, 1958, pp. 564–565.

Mackay et al.: "Endoradiosonde," June 15, 1957, pages 1239 and 1240 of Nature.

RICHARD A. GAUDET, *Primary Examiner.*

W. L. LEGUEDE, JORDAN FRANKLIN, *Examiners.*